United States Patent
Kim et al.

(10) Patent No.: US 11,169,417 B2
(45) Date of Patent: Nov. 9, 2021

(54) METHOD FOR MANUFACTURING OF MULTI-LAYER LIQUID CRYSTAL FILM

(71) Applicant: LG CHEM, LTD., Seoul (KR)

(72) Inventors: Young Jin Kim, Daejeon (KR); Jun Won Chang, Daejeon (KR); Dae Hee Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 152 days.

(21) Appl. No.: 16/079,517

(22) PCT Filed: Aug. 22, 2017

(86) PCT No.: PCT/KR2017/009133
§ 371 (c)(1),
(2) Date: Aug. 23, 2018

(87) PCT Pub. No.: WO2018/043979
PCT Pub. Date: Mar. 8, 2018

(65) Prior Publication Data
US 2019/0056627 A1    Feb. 21, 2019

(30) Foreign Application Priority Data

Aug. 31, 2016 (KR) .................. 10-2016-0111433

(51) Int. Cl.
| | | |
|---|---|---|
| *G02F 1/1337* | (2006.01) | |
| *C09D 4/00* | (2006.01) | |
| *B32B 7/00* | (2019.01) | |
| *B32B 27/08* | (2006.01) | |
| *C09D 133/14* | (2006.01) | |
| *C09D 135/02* | (2006.01) | |
| *C09K 19/56* | (2006.01) | |

(52) U.S. Cl.
CPC .......... *G02F 1/133788* (2013.01); *B32B 7/00* (2013.01); *B32B 27/08* (2013.01); *C09D 4/00* (2013.01); *C09D 133/14* (2013.01); *C09D 135/02* (2013.01); *C09K 19/56* (2013.01); *G02F 1/1337* (2013.01); *G02F 1/133711* (2013.01); *G02F 1/133738* (2021.01); *G02F 1/133742* (2021.01)

(58) Field of Classification Search
CPC .......... G02F 1/13363; G02F 1/133711; G02F 1/133788; G02F 2001/133738; G02F 2001/133742; G02F 2001/133633; G02F 1/133738; G02F 1/133742; G02F 1/133633

USPC ................ 349/124, 130, 132, 135
See application file for complete search history.

(56) References Cited

U.S. PATENT DOCUMENTS

| | | | |
|---|---|---|---|
| 9,383,491 B2 | 7/2016 | Takeda et al. | |
| 2007/0023130 A1* | 2/2007 | Duz | G02B 5/3033 156/163 |
| 2008/0129928 A1 | 6/2008 | Jeng | |
| 2012/0021142 A1* | 1/2012 | Lee | C09D 167/07 428/1.2 |
| 2014/0226115 A1* | 8/2014 | Ibn-Elhaj | G02F 1/133711 349/123 |
| 2015/0029445 A1* | 1/2015 | Takeda | G02B 5/3016 349/96 |
| 2019/0056627 A1 | 2/2019 | Kim et al. | |

FOREIGN PATENT DOCUMENTS

| | | | |
|---|---|---|---|
| CN | 101782701 A | 7/2010 | |
| CN | 103221881 A | 7/2013 | |
| GN | 104345367 A | 2/2015 | |
| JP | 2001004837 A | 1/2001 | |
| JP | 2003-262727 A | 9/2003 | |
| JP | 2007-86511 A | 4/2007 | |
| JP | 2008-245196 A | 10/2008 | |
| JP | 2011-514542 A | 5/2011 | |
| JP | 2012-523581 A | 10/2012 | |
| JP | 2015-043073 A | 3/2015 | |
| JP | WO2015/111474 A1 | 7/2015 | |
| JP | 2019509515 A | 4/2019 | |
| KR | 10-1999-0010267 A | 2/1999 | |
| KR | 10-2004-0002793 A | 1/2004 | |
| KR | 10-2006-0029068 A | 4/2006 | |
| KR | 10-2013-0011195 A | 1/2013 | |
| KR | 101328109 B1 * | 11/2013 | G02B 27/26 |
| KR | 10-2016-0074418 A | 6/2016 | |
| WO | 2013/137632 A1 | 9/2013 | |

OTHER PUBLICATIONS

Computer-generated translation of KR 2013 0011195 (Jan. 2013). (Year: 2013).*

* cited by examiner

*Primary Examiner* — John A McPherson
(74) *Attorney, Agent, or Firm* — Dentons US LLP

(57) ABSTRACT

The present application relates to a method for manufacturing of a multi-layer liquid crystal film and a multi-layer liquid crystal film. The present application provides the method for manufacturing of the multi-layer liquid crystal film capable of improving coatability of liquid crystals, orientation of liquid crystals and adhesive force between liquid crystal films, as well as realizing thinning of a liquid crystal film, and a multi-layer liquid crystal film manufactured by the above method.

9 Claims, 1 Drawing Sheet

[Figure 1]

| |
|---|
| 30 |
| 20 |
| 10 |

[Figure 2]

| |
|---|
| 105 |
| 104 |
| 103 |
| 102 |
| 101 |

[Figure 3]

| |
|---|
| 103 |
| 102 |
| 105 |
| 104 |
| 101 |

METHOD FOR MANUFACTURING OF MULTI-LAYER LIQUID CRYSTAL FILM

TECHNICAL FIELD

The present application relates to a method for manufacturing of a multi-layer liquid crystal film.

This application is a National Stage Application of International Application No. PCT/KR2017/009133 filed on Aug. 22, 2017, and claims the benefit of priority based on Korean Patent Application No. 10-2016-0111433 filed on Aug. 31, 2016, the disclosure of which is incorporated herein by reference in its entirety.

BACKGROUND ART

Retardation films can be used in various applications. For example, the retardation film can be disposed on one or both sides of a liquid crystal cell to improve viewing angle characteristics of a display device. The retardation film is also used for antireflection and securing visibility in a reflective LCD or OLED (organic light emitting device), and the like.

The retardation film can be manufactured, for example, through a liquid crystal material. In order to use the liquid crystal material as a retardation film, it may be necessary to properly orient the liquid crystal material so as to exhibit a desired phase difference. For example, in order to manufacture a multi-layer liquid crystal film in which two or more oriented liquid crystal films are laminated, generally, there is a method of laminating each oriented liquid crystal film through a pressure-sensitive adhesive. However, this method has problems that the process is cumbersome, time consuming and expensive, and the thickness of the final element becomes thick.

Patent Document 1 (Korean Laid-Open Patent Publication No. 10-2004-0002793) on a method for manufacturing of a multi-layer liquid crystal film without using a pressure-sensitive adhesive discloses a technology of coating a horizontally orientational liquid crystal material on a rubbed substrate, then controlling a cure degree of the horizontally oriented liquid crystal film and coating a vertically orientational liquid crystal material thereon. However, in the manufacturing method of Patent Document 1, if the orientation of the vertically oriented liquid crystal is improved, there is a problem that adhesive force between the liquid crystal films is lowered and liquid crystal coatability is lowered, whereas if the liquid crystal coatability is improved, there is a problem that the orientation of the vertically oriented liquid crystal is deteriorated.

DISCLOSURE

Technical Problem

It is a problem to be solved by the present application to provide a method for manufacturing of a multi-layer liquid crystal film capable of improving coatability of liquid crystals, orientation of liquid crystals and adhesive force between liquid crystal films, as well as realizing thinning of a liquid crystal film.

Technical Solution

The present application relates to a method for manufacturing of a multi-layer liquid crystal film. The manufacturing method may comprise steps of forming an alignment film on a first liquid crystal film and forming a second liquid crystal film on the alignment film. In the manufacturing method, the first liquid crystal film may be any one of a vertically oriented liquid crystal film and a horizontally oriented liquid crystal film, and the second liquid crystal film may be the other liquid crystal film.

In the manufacturing the multi-layer liquid crystal film, the manufacturing method is capable of improving coatability of liquid crystals, orientation of liquid crystals and adhesive force between liquid crystal films, as well as realizing thinning of a liquid crystal film by forming an alignment film on one liquid crystal film and forming another liquid crystal film on the alignment film. In addition, the manufacturing method has an advantage that the multi-layer liquid crystal film can be manufactured without any restriction on a phase retardation value of a liquid crystal film.

In one example, the multi-layer liquid crystal film manufactured by the above method may have a peeling cross-cut evaluation result of less than 10 spaces/100 spaces between the first liquid crystal film and the second liquid crystal film. The less than 10 spaces/100 spaces may mean that after making 100 spaces based on the total area of the multi-layer liquid crystal film and attaching them with tapes, the number of the tapes separated upon conducting a peeling cross-cut experiment is less than 10 spaces. When the peeling cross-cut evaluation result is within the above range, it means that the adhesive force between the liquid crystal films is excellent and in the case where the adhesive force between the liquid crystal films is excellent, it may be advantageous in terms of not only a process of stretching a polarizing plate after coating liquid crystals (liquid crystal surface protective film removal) but also a process after finishing a product (if the adhesive force is poor, delamination between the substrate and the liquid crystals occurs upon customer shipment or rework).

In one example, the multi-layer liquid crystal film manufactured by the above method may have a dewetting size estimated between orthogonal polarizing plates, of 50 μm or less, preferably 20 μm or less. When the dewetting size is within the above range, it means that the liquid crystal coatability is excellent, and in the case of excellent liquid crystal coatability, it may be advantageous in that since no bright spot occurs at a viewing angle, the perfection level of the product is enhanced (when the bright spots occur, the film cannot serve as a viewing angle compensation film).

The horizontally oriented liquid crystal film may comprise a horizontally orientational liquid crystal material. The vertically oriented liquid crystal film may comprise a vertically orientational liquid crystal material.

In this specification, the liquid crystal material may mean a material exhibiting liquid crystallinity. The liquid crystal material may comprise a moiety capable of exhibiting liquid crystallinity, for example, a mesogen skeleton.

In this specification, the "horizontally orientational liquid crystal material" may mean a liquid crystal material which is capable of aligning horizontally, and the "vertically orientational liquid crystal material" may mean a liquid crystal material which is capable of aligning vertically.

In this specification, the "horizontal orientation" may mean an oriented state in which the directors of the liquid crystal material are aligned in a state having a tilt angle of about 0 to 5 degrees with respect to the plane of the liquid crystal film.

In this specification, the "vertical orientation" may mean an oriented state in which the directors of the liquid crystal material are aligned in a state having a tilt angle of about 90 to 85 degrees with respect to the plane of the liquid crystal film.

In this specification, the "director" may mean an optical axis of a liquid crystal material. The optical axis herein may mean a slow axis of a liquid crystal material. In one example, when the liquid crystal material has a rod shape, the optical axis may mean the long axis of the liquid crystal material, and in another example, when the liquid crystal material has a discotic shape, it may mean an axis in the normal direction of the discotic plate.

In this specification, the "horizontal orientation" may include planar orientation, twist orientation or cholesteric orientation.

In this specification, the "planar orientation" may mean an oriented state in which the liquid crystal material in the liquid crystal film is horizontally oriented and the directors of the liquid crystal material form a layer in a state of being parallel to each other. The planar orientation can be said to have a uniform horizontal orientation.

In this specification, the "twist orientation" or "cholesteric orientation" may mean a spirally oriented state in which the liquid crystal material in the liquid crystal film is oriented horizontally and the directors of the liquid crystal materials form a layer while being twisted along the helical axis and are oriented.

When a distance for a director of the liquid crystal material to complete a 360 degree rotation is referred to as a "pitch," the liquid crystal film in the twist orientation may have a thickness of less than the pitch. That is, in the liquid crystal film having the twist orientation, the director of the liquid crystal material may not rotate 360 degrees. In a liquid crystal film having the cholesteric orientation, the director of the liquid crystal material may be rotating 360 degrees. The cholesteric orientation has a spiral structure in which the liquid crystal compound directors form a layer while being twisted along the helical axis and are oriented, and the liquid crystal compound may be rotating 360 degrees at the pitch.

The horizontally orientational liquid crystal material and/or the vertically orientational liquid crystal material may be a polymerizable liquid crystal material. That is, the horizontally orientational liquid crystal material and/or the vertically orientational liquid crystal material may comprise a mesogen skeleton and at least one polymerizable functional group. The polymerizable liquid crystal material may comprise, for example, one, two, three, or four or more of the above functional groups. The polymerizable functional group may be an alkenyl group, an epoxy group, an acryloyl group, a methacryloyl group, an acryloyloxy group or a methacryloyloxy group.

The horizontally oriented liquid crystal film may comprise the horizontally orientational liquid crystal material in a polymerized state. The vertically oriented liquid crystal film may comprise the vertically orientational liquid crystal material in a polymerized state. In this specification, "the liquid crystal material is comprised in a polymerized state" may mean a state in which the liquid crystal material is polymerized to form a skeleton such as a main chain or a side chain of the liquid crystal polymer in the liquid crystal film.

As the horizontally orientational liquid crystal material or the vertically orientational liquid crystal material, polymerizable liquid crystal materials mainly used in the art can be used without any limitation.

In one example, the polymerizable liquid crystal material may be a compound represented by Formula 1 below.

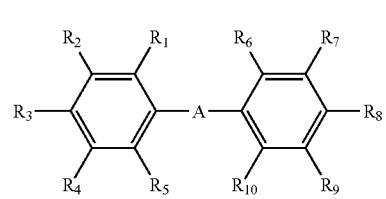

[Formula 1]

In Formula 1 above, A is a single bond, —COO— or —OCO—, $R_1$ to $R_{10}$ are each independently hydrogen, halogen, an alkyl group, an alkoxy group, an alkoxycarbonyl group, a cyano group, a nitro group, —U-Q-P or a substituent of Formula 2 below, or a pair of two adjacent substituents of $R_1$ to $R_5$ or a pair of adjacent two substituents of $R_6$ to $R_{10}$ are linked with each other to form a benzene substituted with —U-Q-P, provided that at least one of $R_1$ to $R_{10}$ is —U-Q-P or a substituent of Formula 2 below, or at least one pair of two adjacent substituents of $R_1$ to $R_6$ or two adjacent substituents of $R_6$ to $R_{10}$ are linked with each other to form a benzene substituted with —U-Q-P, where U is —O—, —COO— or —OCO—, Q is an alkylene group or an alkylidene group, and P is an alkenyl group, an epoxy group, an acryloyl group, a methacryloyl group, an acryloyloxy group, or a methacryloyloxy group.

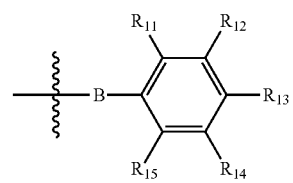

[Formula 2]

In Formula 2 above, B is a single bond, —COO— or —OCO—, $R_{11}$ to $R_{15}$ are each independently hydrogen, halogen, an alkyl group, an alkoxy group, a cyano group, a nitro group or —U-Q-P, provided that at least one of $R_{11}$ to $R_{15}$ is —U-Q-P, where U is —O—, —COO— or —OCO—, Q is an alkylene group or an alkylidene group, P is an alkenyl group, an epoxy group, an acryloyl group, a methacryloyl group, an acryloyloxy group or a methacryloyloxy group.

In Formula 2 above, the symbol

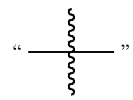

may mean that the moiety is linked to a mother compound. For example, in Formula 2 above,

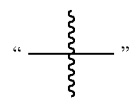

on the left side of B may mean that B is directly linked to a benzene of Formula 1.

The term "single bond" may mean that no separate atom or atomic group is present at the relevant site. For example, In Formulas 1 and 2 above, the term "single bond" means a case where no separate atom is present at the moiety represented by A or B. For example, In Formula 1, when A is a single bond, benzenes on both sides of A may be directly linked to form a biphenyl structure.

The term alkylene group or alkylidene group may be exemplified by an alkylene group or alkylidene group having 1 to 20 carbon atoms, 1 to 16 carbon atoms, 1 to 12 carbon atoms, 1 to 8 carbon atoms, 1 to 4 carbon atoms, 4 to 10 carbon atoms or 6 to 9 carbon atoms, unless otherwise specified. The alkylene group or alkylidene group may be linear, branched or cyclic. The alkylene group or alkylidene group may be optionally substituted with one or more substituents.

The term alkenyl group may be exemplified by an alkenyl group having 2 to 20 carbon atoms, 2 to 16 carbon atoms, 2 to 12 carbon atoms, 2 to 8 carbon atoms, 2 to 4 carbon atoms, 4 to 10 carbon atoms, or 6 to 9 carbon atoms, unless otherwise specified. The alkenyl group may be linear, branched or cyclic. As such an alkenyl group, for example, a vinyl group, an allyl group, a propenyl group, an isopropenyl group, a butenyl group, a hexenyl group, a cyclohexenyl group or an octenyl group, and the like may be exemplified. In addition, the alkenyl group may be optionally substituted with one or more substituents.

In this specification, the substituent which can be substituted to any compound or substituent may be exemplified by halogen, a hydroxy group, an alkyl group, an alkoxy group, an alkenyl group, an epoxy group, a cyano group, a carboxyl group, an isocyanate group, a mercapto group, an acryloyl group, a methacryloyl group, an acryloyloxy group, a methacryloyloxy group or an aryl group, and the like, but is not limited thereto.

The term aryl group may mean a monovalent residue derived from a compound having a benzene ring or comprising a structure in which two or more benzene rings are condensed, or a derivate thereof, unless otherwise specified. Furthermore, it may be a concept including a so-called aralkyl group and the like. In the aryl group, for example, an aryl group having 6 to 22 carbon atoms or 6 to 16 carbon atoms may be included. As such an aryl group, for example, a phenyl group, a phenylethyl group, a phenylpropyl group, a benzyl group, a tolyl group, a xylyl group or a naphthyl group may be exemplified. The aryl group may be optionally substituted with one or more substituents.

In one example, each of P in Formulas 1 and 2 above may be independently an acryloyl group, a methacryloyl group, an acryloyloxy group or a methacryloyloxy group. Also, in another example, each of P in Formulas 1 and 2 above may be independently an acryloyloxy group or a methacryloyloxy group.

In Formulas 1 and 2 above, the —U-Q-P or residue of Formula 2, in which at least one may be present, may exist, for example, at a position of $R_3$, $R_8$ or $R_{13}$, and for example, there may be one or two of the above. Also, in the compound of Formula 1 above or the residue of Formula 2, the substituent groups other than the —U-Q-P or residue of Formula 2 may be, for example, hydrogen, halogen, a linear or branched alkyl group having 1 to 4 carbon atoms, a cycloalkyl group having 4 to 12 carbon atoms, a cyano group, an alkoxy group having 1 to 4 carbon atoms, or a nitro group. In another example, the substituents other than the —U-Q-P or residue of Formula 2 may be chlorine, a linear or branched alkyl group having 1 to 4 carbon atoms, a cycloalkyl group having 4 to 12 carbon atoms, an alkoxy group having 1 to 4 carbon atoms or a cyano group.

In one example, as the horizontally orientational liquid crystal material, for example, a compound in which polarities at both ends are little different or the same can be used. In one example, as the horizontally orientational liquid crystal compound, a compound having functional groups, the polarities of which are little different or the same, at any one of $R_7$ to $R_9$ and any one of $R_2$ to $R_4$ in Formula 1 above, may be used. Specifically, it may be a compound in which any one of $R_7$ to $R_9$ and any one of $R_2$ to $R_4$ is —U-Q-P or a substituent of Formula 2; or a pair of two adjacent substituents of $R_7$ to $R_9$ and a pair of two adjacent substituents of $R_2$ to $R_4$ are linked with each other to form a benzene substituted with —U-Q-P.

Here, U may be —O—, —OCO— or —OCO—, Q may be an alkylene group or an alkylidene group, and P may be an acryloyl group, a methacryloyl group, an acryloyloxy group or a methacryloyloxy group.

Also, when any one of $R_7$ to $R_9$ and any one of $R_2$ to $R_4$ in Formula 1 are selected as above with regard to the horizontally orientational liquid crystal material, the other substituents may be hydrogen or an alkyl group having 1 to 6 carbon atoms. However, the horizontally orientational liquid crystal material is not limited thereto and can be appropriately selected depending on the use of the present application.

Furthermore, as the vertically orientational liquid crystal material, for example, a compound having a different polarity at both ends of the liquid crystal compound can be used. In one example, the vertically orientational liquid crystal material may be a compound in which any one of $R_7$ to $R_9$ in Formula 1 is —U-Q-P or a substituent of Formula 2; or a pair of two adjacent substituents of $R_7$ to $R_9$ are linked with each other to form a benzene substituted with —U-Q-P.

Here, U may be —O—, —OCO— or —OCO—, Q may be an alkylene group or an alkylidene group, and P may be an acryloyl group, a methacryloyl group, an acryloyloxy group or a methacryloyloxy group.

Also, when any one of $R_7$ to $R_9$ in Formula 1 is selected as above with regard to the vertically orientational liquid crystal material, the other substituents may be hydrogen or an alkyl group. However, the vertically orientational liquid crystal material is not limited thereto, and any liquid crystal compound having a different polarity at both ends can be used without limitation.

The horizontally oriented liquid crystal film may have a normal wavelength dispersion characteristic, a flat wavelength dispersion characteristic, or a reverse wavelength dispersion characteristic. In this specification, the normal wavelength dispersion characteristic may mean a characteristic satisfying Equation 1, and the flat wavelength dispersion characteristic may mean a characteristic that satisfies Equation 2 below, and the reverse wavelength dispersion characteristic may mean a characteristic that satisfies Equation 3 below. In one example, wavelength dispersibility of the horizontally oriented liquid crystal film may be, for example, a value of R (450)/R (550) of the following equation may be 0.8 to 1.2.

$$R(450)/R(550) > 1 \qquad \text{[Equation 1]}$$

$$R(450)/R(550) \approx 1 \qquad \text{[Equation 2]}$$

$$R(450)/R(550) < 1 \qquad \text{[Equation 3]}$$

In Equations 1 to 3 above, "R (λ)" may mean an in-plane retardation of the liquid crystal film with respect to the light having a wavelength of λ nm. The in-plane retardation is a value calculated by (nx−ny)×d. Here, nx is a refractive index in the x-axis direction of the liquid crystal film, ny is a refractive index in the y-axis direction of the liquid crystal film, and d is a thickness of the liquid crystal film. Here, the x-axis means any one direction on the plane of the liquid crystal film, and the y-axis means a direction on the plane perpendicular to the x-axis. In one example, the x-axis may be parallel to the slow axis of the liquid crystal film, and the y-axis may be parallel to the fast axis of the liquid crystal film. In one example, the slow axis may be parallel to the director of the liquid crystal material.

According to a first embodiment of the manufacturing method, the first liquid crystal film is a horizontally oriented liquid crystal film, the second liquid crystal film is a vertically oriented liquid crystal film, and the alignment film may be a vertical alignment film. Hereinafter, the manufacturing method of the multi-layer liquid crystal film according to the first embodiment will be described in detail.

The horizontally oriented liquid crystal film can be manufactured by applying the horizontally orientational liquid crystal material on a substrate on which a horizontal alignment film is formed and polymerizing it.

In this specification, when describing the application or coating of B on A, it may mean to perform appropriate surface treatment on A and to apply or coat B, unless otherwise specified. As the surface treatment, for example, corona treatment, plasma treatment, and the like may be exemplified. The surface treatment can improve adhesion between the A element and the B element.

As the substrate, an inorganic film such as a glass film, a crystalline or amorphous silicon film, a quartz film or an ITO (indium tin oxide) film, or a plastic film, and the like can be used. As the substrate, an optically isotropic substrate, or an optically anisotropic substrate such as a retardation layer, or a polarizing plate or a color filter substrate, and the like can be used.

As the plastic film, a substrate layer comprising TAC (triacetyl cellulose); COP (cyclo olefin copolymer) such as a norbornene derivative; PMMA (poly(methyl methacrylate)); PC (polycarbonate); PE (polyethylene); PP (polypropylene); PVA (polyvinyl alcohol); DAC (diacetyl cellulose); Pac (Polyacrylate); PES (polyethersulfone); PEEK (polyether ether ketone); PPS (polyphenylsulfone), PEI (polyetherimide); PEN (polyethylenemaphthatlate); PET (polyethylene terephtalate); PI (polyimide); PSF (polysulfone); PAR (polyarylate) or an amorphous fluororesin, and the like may be used, without being limited thereto. According to one embodiment of the present application, normal TAC may be used. A coating layer of gold, silver or a silicon compound such as silicon dioxide or silicon monoxide, or a coating layer such as a antireflective layer may also be present on the substrate.

The horizontal alignment film formed on the substrate may be a photo-alignment film. When the photo-alignment film is used as the horizontal alignment film, it may be advantageous to improve liquid crystal coatability, and adhesive force between the liquid crystal films. The photo-alignment film may comprise a photo-alignment film material. In this specification, the "photo-alignment film material" may mean a material exhibiting liquid crystal orientation by irradiation with light, for example, polarized ultraviolet light, for example, linearly polarized ultraviolet light. The photo-alignment film can be formed by applying the photo-alignment film material on the substrate and irradiating it with polarized ultraviolet light, for example, linearly polarized ultraviolet light. As the photo-alignment film material, polycinnamate, polyamide, polyimide, polyvinyl alcohol or polyamic acid, and the like can be used. The application of the horizontally orientational liquid crystal material on the horizontal alignment film can be performed through a conventional coating method. The coating method may be exemplified by roll coating, bar coating, comma coating, ink jet coating or spin coating, and the like. In this specification, the application of a certain material can be carried out through the above coating method, unless otherwise specified.

The polymerization of the horizontally orientational liquid crystal material can be performed by irradiating the material with ultraviolet light. The ultraviolet irradiation can be performed by irradiating the material with ultraviolet light at a temperature from room temperature to 40° C. or lower and a light quantity of 200 mJ to 1000 mJ for 1 second to 10 seconds.

The manufacturing method may comprise a step of forming a vertical alignment film on the horizontally oriented liquid crystal film. The vertical alignment film can improve coatability and orientation of the liquid crystal material.

The vertical alignment film may include a multifunctional acrylate. In the present specification, the multifunctional acrylate may mean a material having two or more acrylate groups. As the multifunctional acrylate, PETA (pentaerythritol triacrylate), DCP-A (dimethyl tricycle decane dimethacrylate), TMPTA (trimethylolpropane triacrylate) or DPHA (dipentaerythritol penta-/hexa-acrylate), and the like can be used. When the vertical alignment film comprises the multifunctional acrylate, it is advantageous in terms of substrate hardness, process time, and adhesive force with a substrate.

The vertical alignment film may be prepared by applying a vertical alignment film composition comprising the multifunctional acrylate on the horizontally oriented liquid crystal film and polymerizing it.

The vertical alignment film composition may comprise 2 wt % to 15 wt % of a multifunctional acrylate, 0.2 wt % to 2 wt % of a photoinitiator, and a remainder solvent. The vertical alignment film composition having such a composition may be advantageous for improving liquid crystal coatability and adhesive force between the liquid crystal films.

The application of the vertical alignment film composition on the horizontally oriented liquid crystal film can be carried out by a conventional coating method. The coating method can be exemplified by roll coating, bar coating, comma coating, ink jet coating or spin coating, and the like.

The polymerization of the vertical alignment film composition can be performed by irradiating the composition with ultraviolet light. The ultraviolet irradiation can be performed by irradiating the composition with ultraviolet light at a temperature from room temperature to 40° C. or lower and a light quantity of 200 mJ to 1500 mJ for 1 second to 10 seconds.

The manufacturing method may comprise a step of forming a vertically oriented liquid crystal film on the vertical alignment film. Since the vertically oriented liquid crystal film is formed on the vertical alignment film, it is possible to improve coatability and orientation of the liquid crystal material.

The vertically oriented liquid crystal film may be prepared by applying the vertically orientational liquid crystal material on the vertical alignment film and polymerizing it.

The polymerization of the vertically orientational liquid crystal material can be performed by irradiating the material with ultraviolet light. The ultraviolet irradiation can be performed by irradiating the material with ultraviolet light at a temperature from room temperature to 50° C. or lower and a light quantity of 300 mJ to 1500 mJ for 1 second to 10 seconds.

According to a second embodiment of the manufacturing method, the first liquid crystal film is a vertically oriented liquid crystal film, the second liquid crystal film is a horizontally oriented liquid crystal film, and the alignment film may be a horizontal alignment film. Hereinafter, the manufacturing method of the multi-layer liquid crystal film according to the second embodiment will be described in detail.

The vertically oriented liquid crystal film can be manufactured by applying the vertically orientational liquid crystal material on a substrate on which a vertical alignment film is formed and polymerizing it.

As for the above substrate, the contents described in the item of the first embodiment may be applied equally. The vertical alignment film can be manufactured by applying a vertical alignment film composition on the substrate and polymerizing it. As for the composition of the vertical alignment film composition and the conditions for forming the vertical alignment film, the contents described in the item of the first embodiment may be applied equally. As for the polymerization conditions of the vertically orientational liquid crystal material, the contents described in the item of the first embodiment may also be applied equally.

The manufacturing method may comprise a step of forming a horizontal alignment film on the vertically oriented liquid crystal film. The horizontal alignment film can improve coatability and orientation of the liquid crystal material.

The horizontal alignment film can be prepared by applying a photo-alignment film material on the vertically oriented film and irradiating it with polarized ultraviolet light, for example, linearly polarized ultraviolet light. More specifically, the horizontal alignment film can be manufactured by applying a horizontal alignment film composition at a temperature from room temperature to 40° C. or lower, and then irradiating it with polarized ultraviolet light at a light quantity of 200 mJ to 1000 mJ for 1 second to 10 seconds. As for the photo-alignment film material, the contents described in the item of the first embodiment may be applied equally.

The horizontally oriented liquid crystal film can be manufactured by applying a horizontally orientational liquid crystal material on the horizontal alignment film and polymerizing it. As for the polymerization conditions of the horizontally orientational liquid crystal material, the contents described in the item of the first embodiment may be applied equally.

The manufacturing method of the present application may not form a pressure-sensitive adhesive between the first liquid crystal film and the alignment film or between the second liquid crystal film and the alignment film. Accordingly, the manufacturing method can simplify the process, reduce time and cost, and thin the thickness of the final liquid crystal film, as compared to a conventional method of laminating two or more liquid crystal films via a pressure-sensitive adhesive.

The manufacturing method of the present application may further laminate a liquid crystal film on the second liquid crystal film, if necessary, according to the above method for manufacturing of the multi-layer liquid crystal film. For example, after the vertical alignment film is formed on the second liquid crystal film, the vertically oriented liquid crystal film can be formed on the vertical alignment film, or after the horizontal alignment film is formed on the second liquid crystal film, the horizontally oriented liquid crystal film can be formed on the horizontal alignment film.

The thickness of the horizontally oriented liquid crystal film or the vertically oriented liquid crystal film may be appropriately adjusted depending on the use of the multi-layer liquid crystal film. In one example, the horizontally oriented liquid crystal film or the vertically oriented liquid crystal film may have a thickness of 1 μm to 10 μm, preferably a thickness of 1 μm to 5 μm, but is not limited thereto.

The present application relates to a multi-layer liquid crystal film. The multi-layer liquid crystal film may comprise a first liquid crystal film, an alignment film present on the first liquid crystal film, and a second liquid crystal film present on the alignment film. In the multi-layer liquid crystal film, the first liquid crystal film may be any one liquid crystal film of a vertically oriented liquid crystal film and a horizontally oriented liquid crystal film, and the second liquid crystal film may be the other liquid crystal film. FIG. 1 illustratively shows the multi-layer liquid crystal film of the present application which comprises the first liquid crystal film (10), the alignment film (20) and the second liquid crystal film (30) in sequence.

The multi-layer liquid crystal film may be manufactured by the above manufacturing method. Thus, as for the multi-layer liquid crystal film, the contents described in the manufacturing method may be applied equally, unless otherwise specified.

The horizontally oriented liquid crystal film may comprise a horizontally orientational liquid crystal material in a polymerized state. The vertically oriented liquid crystal film may comprise a vertically orientational liquid crystal material in a polymerized state.

According to the first embodiment of the multi-layer liquid crystal film, the first liquid crystal film may be a horizontally oriented liquid crystal film, the second liquid crystal film may be a vertically oriented liquid crystal film, and the alignment film may be a vertical alignment film. In this case, the multi-layer liquid crystal film may further comprise a horizontal alignment film and a substrate present on the lower part of the first liquid crystal film. FIG. 2 illustratively shows a multi-layer liquid crystal film comprising a substrate (101), a horizontal alignment film (102), a horizontally oriented liquid crystal film (103), a vertical alignment film (104) and a vertically oriented liquid crystal film (105).

According to the second embodiment of the multi-layer liquid crystal film, the first liquid crystal film may be a vertically oriented liquid crystal film, the second liquid crystal film may be a horizontally oriented liquid crystal film, and the alignment film may be a horizontal alignment film. In this case, the multi-layer liquid crystal film may further comprise a vertical alignment film and a substrate present on the lower part of the first liquid crystal film. FIG. 3 illustratively shows a multi-layer liquid crystal film comprising a substrate (101), a vertical alignment film (104), a vertically oriented liquid crystal film (105), a horizontal alignment film (102), and a horizontally oriented liquid crystal film (103).

The multi-layer liquid crystal film of the present application may not comprise a pressure-sensitive adhesive between the first liquid crystal film and the alignment film or between the second liquid crystal film and the alignment film. Therefore, the multi-layer liquid crystal film has an advantage that it can thin the thickness as compared to the multi-layer liquid crystal film laminated via a pressure-sensitive adhesive.

The present application relates to a use of the multi-layer liquid crystal film. The multi-layer liquid crystal film can be used for various applications such as a polarizing plate, an optical retardation film and a compensation film. In particular, the multi-layer liquid crystal film can be variously used for optical elements requiring application of the horizontally oriented liquid crystal film and the vertically oriented liquid crystal film. More specifically, the multi-layer liquid crystal film can be used for a polarizing plate of an organic electronic element, a polarizing plate of an automobile display, or the like. As long as the organic electronic element and the display comprise the multi-layer liquid crystal film, other components or structures, and the like are not particularly limited, and all contents known in this field can be appropriately applied.

Advantageous Effects

The present application has effects that can provide a method for manufacturing of a multi-layer liquid crystal film capable of improving coatability of liquid crystals, orientation of liquid crystals and adhesive force between liquid crystal films, as well as realizing thinning of a liquid crystal film.

BRIEF DESCRIPTION OF DRAWINGS

FIG. 1 illustratively shows a multi-layer liquid crystal film of the present application.

FIG. 2 is a schematic diagram of a multi-layer liquid crystal film in a first embodiment of the present application.

FIG. 3 is a schematic diagram of a multi-layer liquid crystal film in a second embodiment of the present application.

MODE FOR INVENTION

Hereinafter, the present application will be specifically described by way of the following examples, but the scope of the present application is not limited by the following examples.

Example 1

After corona treatment on the surface of a plastic substrate (normal TAC) (thickness: 40 μm), a photo-alignment film material (4-benzyloxy-cinnamate-propyl-acrylate) was applied thereon and irradiated with polarized ultraviolet light to form a photo-alignment film. After corona treatment on the surface of the photo-alignment film, a horizontally orientational liquid crystal composition (a horizontally orientational liquid crystal material (RMM1290, Merck) was diluted with toluene and butyl cellosolve solvents to a concentration of 25 wt %) was applied thereon, and irradiated with ultraviolet light at a light quantity of 700 mJ and polymerized to form a horizontally oriented liquid crystal film having a thickness of 1.5 μm. After corona treatment on the surface of the horizontally oriented liquid crystal film, a vertical alignment film composition (comprising 5 wt % of a multifunctional acrylate, PETA, 0.5 wt % of a photoinitiator, Irg184, and the remainder solvent, toluene) was applied thereon, and irradiated with ultraviolet light at a light quantity of 700 mJ and polymerized to form a vertical alignment film. After corona treatment on the surface of the vertical alignment film, a vertically orientational liquid crystal composition (a vertically orientational liquid crystal material (RMM460, Merck) was diluted with toluene and diethylene glycol dimethyl ether solvents to a concentration of 23%) was applied thereon, and irradiated with ultraviolet light at a light quantity of 1000 mJ to form a vertically oriented liquid crystal film having a thickness of 1.5 μm, thereby manufacturing a multi-layer liquid crystal film. The total thickness of the multi-layer liquid crystal film is about 43 μm.

Comparative Example 1

A multi-layer liquid crystal film was manufactured in the same manner as in Example 1, except that in Example 1, the vertically oriented liquid crystal film was directly formed on the horizontally oriented liquid crystal film without forming the vertical alignment film.

Comparative Example 2

A photo-alignment film was formed on a plastic substrate (normal TAC) (thickness: 40 μm) and a horizontally orientational liquid crystal material was applied on the photo-alignment film to manufacture a horizontally oriented liquid crystal film having a thickness of 1.5 μm. A vertical alignment film was formed on a plastic substrate (normal TAC) (thickness: 40 μm) and the vertically orientational liquid crystal material was applied on the vertical alignment film to manufacture a vertically oriented liquid crystal film having a thickness of 1.5 μm. The horizontally oriented liquid crystal film and the vertically oriented liquid crystal film were laminated through an acrylate-based pressure-sensitive adhesive (LG Chem) having a thickness of 23 μm to manufacture a multi-layer liquid crystal film. The total thickness of the manufactured multi-layer liquid crystal film is about 106 μm, and the total thickness of the manufacture multi-layer liquid crystal film is about 66 μm, even if the substrate of the vertically oriented liquid crystal film is excluded.

Example 2

After corona treatment on the surface of a plastic substrate (normal TAC) (thickness: 40 μm), a vertical alignment film composition (comprising 5 wt % of a multifunctional acrylate, PETA, 0.5 wt % of a photoinitiator, Irg184, and the remainder solvent, toluene) was applied thereon, and irradiated with ultraviolet light at a light quantity of 700 mJ and polymerized to form a vertical alignment film. After corona treatment on the surface of the vertical alignment film, a vertically orientational liquid crystal composition (a vertically orientational liquid crystal material (RMM460, Merck) was diluted with toluene and diethylene glycol dimethyl ether solvents to a concentration of 23%) was applied thereon, and irradiated with ultraviolet light at a light quantity of 1000 mJ to form a vertically oriented liquid crystal film having a thickness of 1.5 μm. After corona treatment on the surface of the vertically oriented liquid crystal film, a photo-alignment film material (4-benzyloxy-cinnamate-propyl-acrylate) was applied thereon and irradiated with polarized ultraviolet light to form a photo-alignment film. After corona treatment on the surface of the photo-alignment film, a horizontally orientational liquid crystal composition (a horizontally orientational liquid crystal material (RMM1290, Merck) was diluted with toluene and butyl cellosolve solvents to a concentration of 25 wt %) was applied thereon, and irradiated with ultraviolet light at a light quantity of 700 mJ and polymerized to form a horizontally oriented liquid crystal film having a thickness of 1.5 μm, thereby manufacturing a multi-layer liquid crystal film. The total thickness of the multi-layer liquid crystal film is about 43 μm.

Comparative Example 3

A multi-layer liquid crystal film was manufactured in the same manner as in Example 2, except that in Example 2, the horizontally oriented liquid crystal film was directly formed on the vertically oriented liquid crystal film without forming the horizontal alignment film.

Example 3

A multi-layer liquid crystal film was manufactured in the same manner as in Example 1, except that in Example 1, as the vertical alignment film composition, a composition comprising 2 wt % of a multifunctional acrylate, PETA, 0.5 wt % of a photoinitiator, Irg184 and the remainder solvent, toluene was used.

Example 4

A multi-layer liquid crystal film was manufactured in the same manner as in Example 1, except that in Example 1, as the vertical alignment film composition, a composition comprising 15 wt % of a multifunctional acrylate, PETA, 0.5 wt % of a photoinitiator, Irg184 and the remainder solvent, toluene was used.

Comparative Example 4

A multi-layer liquid crystal film was manufactured in the same manner as in Example 1, except that in Example 1, as the vertical alignment film composition, a composition comprising 1.0 wt % of a multifunctional acrylate, PETA, 0.5 wt % of a photoinitiator, Irg184 and the remainder solvent, toluene was used.

Comparative Example 5

A multi-layer liquid crystal film was manufactured in the same manner as in Example 1, except that in Example 1, as the vertical alignment film composition, a composition comprising 20.0 wt % of a multifunctional acrylate, PETA, 0.5 wt % of a photoinitiator, Irg184 and the remainder solvent, toluene was used.

Comparative Example 6

A multi-layer liquid crystal film was manufactured in the same manner as in Example 2, except that in Example 2, as the horizontal alignment film, the rubbing alignment film prepared by rubbing a rubbing cloth made of rayon was used.

Experimental Example 1 Evaluation of Coatablity

After the polarizing plates were orthogonal to each other, a multi-layer liquid crystal film was disposed between the polarizing plates to evaluate the coatability in a large area. Specifically, the magnitude of dewetting was evaluated using a polarization microscope (NIKON, ECLIPSE LV100 POL), and the results were shown in Table 1 below.

Experimental Example 2 Adhesive Force Between Horizontally Oriented Liquid Crystal and Vertically Oriented Liquid Crystal The adhesive force between the horizontally oriented liquid crystal and the vertically oriented liquid crystal was evaluated by a cross-cut method using a Nichiban tape (NICHIBAN Co., Ltd., CT-24). Specifically, the adhesive force between the horizontally oriented liquid crystal and the vertically oriented liquid crystal was evaluated by peeling test after cross-cut carried out by making 100 spaces based on the total area (width×length: 5 cm×5 cm) of the liquid crystal film, attaching with the tape and then measuring the number of separated tapes upon carrying out the experiment, and the results were shown in Table 1 below. In Table 1 below, the result means the number of separated tapes of 100 tapes.

TABLE 1

|  | Coatability Evaluation (dewetting size, μm) | Peeling Test Results after Cross-cut (n/100) |
|---|---|---|
| Example 1 | 10 or less | less than 10 |
| Example 2 | 10 or less | 50 |
| Example 3 | 15 | less than 10 |
| Example 4 | 15 | less than 10 |
| Comparative Example 1 | 100 | 80 |
| Comparative Example 2 | — | 80 |
| Comparative Example 3 | 100 | 80 |
| Comparative Example 4 | 80 | less than 20 |
| Comparative Example 5 | 20 | 80 |
| Comparative Example 6 | 100 | — |

EXPLANATION OF REFERENCE NUMERALS

10: first liquid crystal film
20: alignment film
30: second liquid crystal film
101: substrate
102: horizontal alignment film
103: horizontally oriented liquid crystal film
104: vertical alignment film
105: vertically oriented liquid crystal film

The invention claimed is:

1. A method for manufacturing of a multi-layer liquid crystal film comprising steps of:
   forming a vertical alignment film, wherein the vertical alignment film is formed by applying a vertical alignment film composition consisting of: 2 wt % to 15 wt % of a multifunctional acrylate, 0.2 wt % to 2 wt % of a photoinitiator and a remainder solvent on a substrate, and curing the composition;
   forming a vertically oriented liquid crystal film on the vertical alignment film;
   forming a horizontal alignment film on the vertically oriented liquid crystal film, wherein the horizontal alignment film is manufactured by applying a photo-alignment film composition and irradiating the composition with polarized ultraviolet light; and forming a horizontally oriented liquid crystal film on the horizontal alignment film, or forming a horizontal alignment film;

forming a horizontally oriented liquid crystal film on the horizontal alignment film, wherein the horizontal alignment film is manufactured by applying a photo-alignment film composition on a substrate and irradiating the composition with polarized ultraviolet light;

forming a vertical alignment film on the horizontally oriented liquid crystal film, wherein the vertical alignment film is formed by applying a vertical alignment film composition consisting of: 2 wt % to 15 wt % of a multifunctional acrylate, 0.2 wt % to 2 wt % of a photoinitiator and a remainder solvent, and curing the composition; and forming a vertically oriented liquid crystal film on the vertical alignment film.

2. The method for manufacturing of the multi-layer liquid crystal film according to claim 1, wherein the vertically oriented liquid crystal film is manufactured by applying a vertically orientational liquid crystal material on the vertical alignment film and polymerizing it.

3. The method for manufacturing of the multi-layer liquid crystal film according to claim 1, wherein the horizontally oriented liquid crystal film is manufactured by applying a horizontally orientational liquid crystal material on the horizontal alignment film and polymerizing it.

4. The method for manufacturing of the multi-layer liquid crystal film according to claim 1, wherein no pressure-sensitive adhesive is formed between the vertically oriented liquid crystal film and the vertical alignment film, or between the horizontally oriented liquid crystal film and the horizontal alignment film.

5. The method for manufacturing of the multi-layer liquid crystal film according to claim 1, wherein the photo-alignment composition comprises: polycinnamate, polyamide, polyimide, polyvinyl alcohol or polyamic acid.

6. The method for manufacturing of the multi-layer liquid crystal film according to claim 1, wherein the polarized ultraviolet light is linearly polarized ultraviolet light.

7. The method for manufacturing of the multi-layer liquid crystal film according to claim 1, comprising irradiating the photo-alignment film composition with the ultraviolet light at a temperature from room temperature to 40° C. or lower, and a light quantity of 200 mJ to 1000 mJ, for 1 second to 10 seconds.

8. The method for manufacturing of the multi-layer liquid crystal film according to claim 1, wherein the vertical alignment film is formed by irradiating the vertical alignment film composition with ultraviolet light at a temperature from room temperature to 40° C. or lower, and a light quantity of 200 mJ to 1500 mJ for 1 second to 10 seconds.

9. The method for manufacturing of the multi-layer liquid crystal film according to claim 1, wherein the photo-alignment composition comprises polycinnamate.

* * * * *